J. N. BASKETT & J. H. RODES.
LIQUID DISPENSER.
APPLICATION FILED MAY 3, 1912.
1,062,576.
Patented May 20, 1913.
2 SHEETS—SHEET 1.
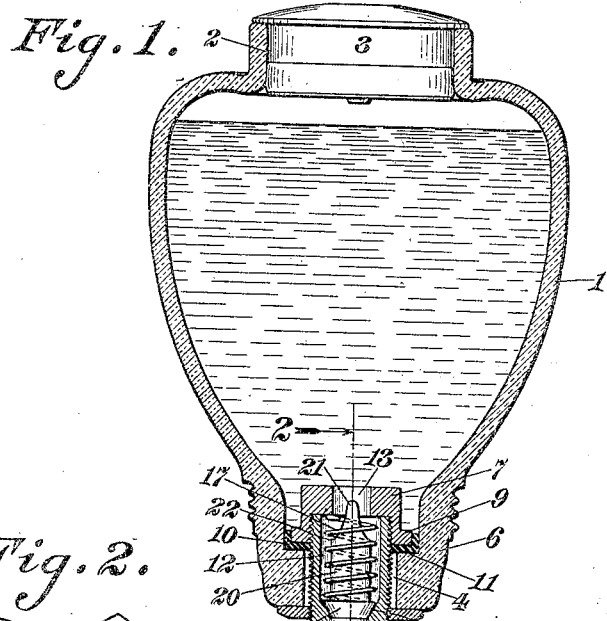
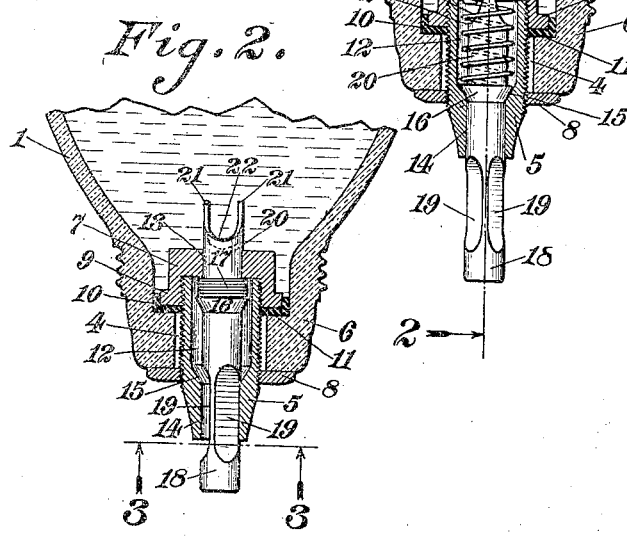
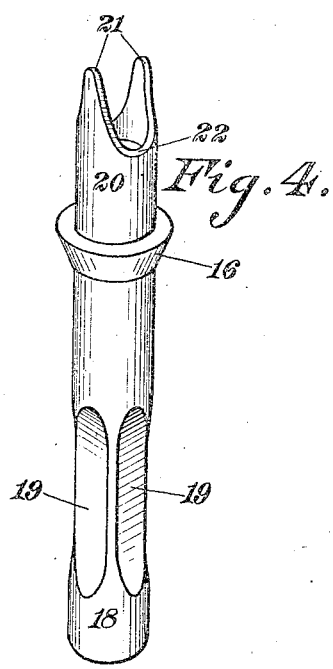
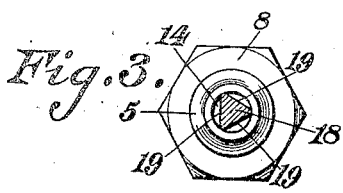
Witnesses:
Harry H. Peiss.
George G. Anderson.
Inventors:
James N. Baskett and Joseph H. Rodes,
By Hugh K. Wagner,
Their Attorney.

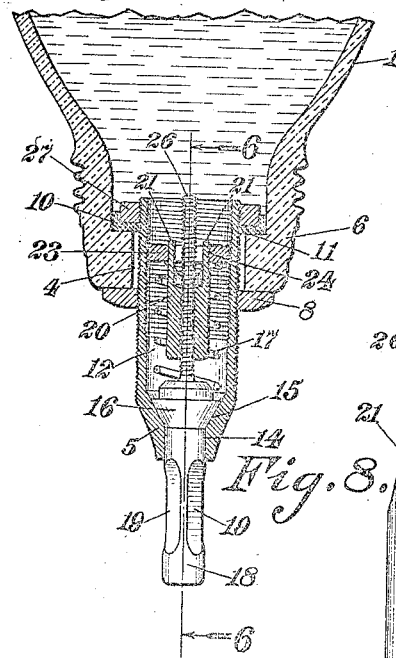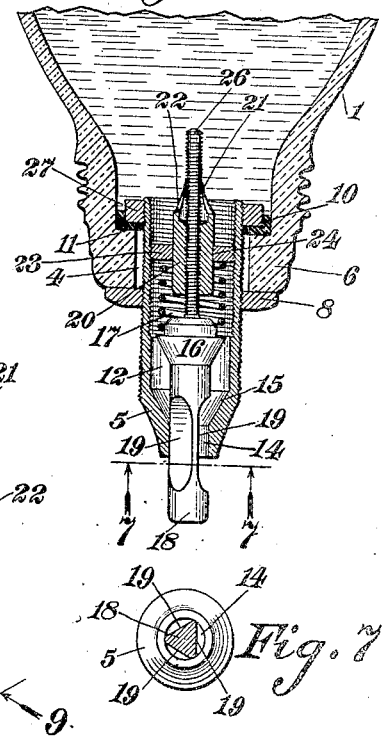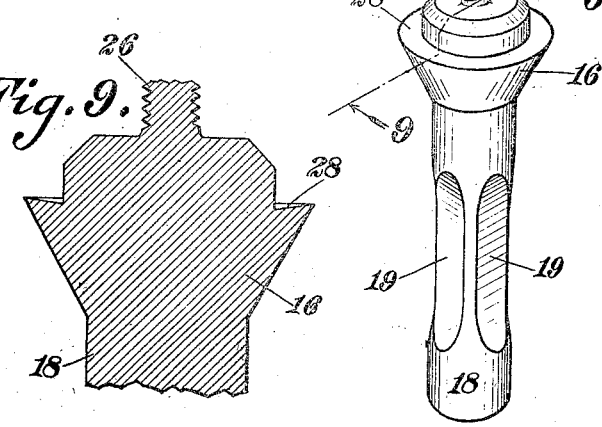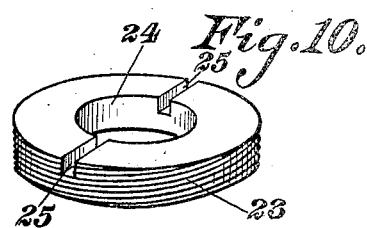

UNITED STATES PATENT OFFICE.

JAMES N. BASKETT AND JOSEPH H. RODES, OF ST. LOUIS, MISSOURI.

LIQUID-DISPENSER.

1,062,576.

Specification of Letters Patent.

Patented May 20, 1913.

Application filed May 3, 1912. Serial No. 694,918.

*To all whom it may concern:*

Be it known that we, JAMES N. BASKETT and JOSEPH H. RODES, citizens of the United States, residing at the city of St. Louis, State of Missouri, have invented certain new and useful Improvements in Liquid-Dispensers, of which the following is a specification.

This invention relates to liquid dispensers, and has for its object to provide an apparatus of this character having an improved valve which is adapted to allow a predetermined quantity of liquid to discharge each time same is operated. The apparatus is primarily intended to hold liquid soap to be used at wash-stands, etc., though adapted, of course, to hold liquid flavors to be used at soda-fountains, and the like, or for any other similar purpose.

Further, the present invention consists of the novel features of construction and arrangement of parts, as will be hereinafter more fully described and pointed out in the claims.

In the accompanying drawings forming part of this specification, in which like numbers of reference denote like parts wherever they occur. Figure 1 is a sectional view of a liquid dispenser embodying this invention; Fig. 2 is a sectional view on the line 2—2, Fig. 1, showing the valve raised from its seat; Fig. 3 is a sectional view on the line 3—3, Fig. 2; Fig. 4 is a perspective view, on an enlarged scale, of the valve; Fig. 5 is a sectional view of a liquid dispenser embodying an alternate form of valve; Fig. 6 is a sectional view on the line 6—6, Fig. 5, showing the valve raised from its seat; Fig. 7 is a sectional view on the line 7—7, Fig. 6; Fig. 8 is a perspective view, on an enlarged scale, of the valve; Fig. 9 is a sectional view, on an enlarged scale, on the line 9—9, Fig. 8; and Fig. 10 is a perspective view, on an enlarged scale, of the guide-nut.

The dispenser comprises the receptacle 1 which may be formed of glass, metal, or any other suitable material. An opening 2 in the top of the receptacle 1 allows the receptacle to be filled with the liquid, and is provided with a removable cover 3. The bottom of the receptacle 1 contains an opening 4 through which a valve-casing 5 extends, said opening 4 being preferably surrounded by a neck 6. The valve-casing 5 is preferably cylindrical and is externally screw-threaded, the upper end of said casing having an internally screw-threaded cap 7 fitted thereon and the lower end of said valve-casing being preferably tapered and smooth and extending below the lower end of the neck 6. A nut 8 on the lower part of the valve-casing 5 abuts the lower end of the neck 6 and thereby causes the flange 9 on cap 7 to press a washer 10 of rubber, leather, or any other suitable material against an annular shoulder or offset 11 in opening 4, with the result of holding the valve-casing 5 firmly in place in opening 4, the washer 10, in turn, preventing the liquid from leaking out of the receptacle 1 through the opening 4.

A chamber 12 in the valve-casing 5 communicates at its upper end with an opening 13 in cap 7 and at its lower end with a passage 14 in the lower part of said valve-casing, said chamber 12 being preferably cylindrical and larger in diameter than either the opening 13 or the passage 14. The lower end of the wall of chamber 12 is preferably tapered in order to form a valve-seat 15 against which a valve 16 is normally held by a spring 17, said valve being preferably conical and having a valve-stem 18 which extends through the passage 14 and projects below the lower end of the valve-casing 5. The valve-stem 18 has substantially the same diameter as the passage 14 and is provided with a cut-away portion 19 or a plurality of such cut-away portions formed in its periphery, so that, when the valve 16 is raised off its seat 15 by pushing upwardly against the lower end of the valve-stem 18 with the palm of the operator's hand, the liquid in the chamber 12 will not flow from said chamber into the passage 14 until said stem has been raised sufficiently to bring the upper end of each cut-away portion 19 into communication with said chamber, as illustrated in Fig. 2, whereupon the liquid in said chamber flows through each cut-away portion 19 and down the sides of the valve-stem 18 into the operator's hand. While the valve 16 is held in a raised position so as to allow the liquid in the chamber 12 to egress through the cut-away portions 19 of stem 18 as just described, air passes through said cut-away portions into the chamber 12, in order to fill the space displaced by the outflowing liquid. As soon as pressure is released from the valve-stem 18, the spring 17 returns the valve 16 and said stem to their normal position.

The liquid in the receptacle 1 flows through the opening 13 into the chamber 12, and in order to allow only the quantity of liquid within the chamber 12 to discharge through the passage 14 each time the valve 16 is raised off its seat 18 sufficiently to allow the liquid in chamber 12 to egress through the cut-away portions 19 of stem 18, as hereinabove described, the following means is provided so that the opening 13 will be closed just previous to the opening of the passage 14. A member 20 borne by valve 16 extends above said valve, in alinement with the opening 13, and is preferably formed cylindrical with substantially the same diameter as the opening 13 in order to slide into and out of said opening. For the purpose of causing the member 20 to enter readily the opening 13, said member is provided with a projection 21 or a plurality of such projections on its upper end, each of which projections extends normally into said opening. In practice it is preferable to use a member 20 having a pair of projections 21, said projections being preferably tapered and disposed diametrically opposite each other, as depicted in Fig. 4, so that only part of the upper ends of said projections engage the wall of opening 13, in order to guide member 20 when same is raised with valve 16. By this arrangement a space is left between the projections 21 in order to allow the chamber 12 to communicate normally with the interior of the receptacle 1, thus allowing the liquid to flow from said receptacle into said chamber. The member 20 moves upwardly with the valve 16, when the latter is raised off its seat 15 as hereinabove described, and when said member has been raised sufficiently to cause the upper edge 22 thereof to enter the opening 13, said member closes said opening just before the cut-away portions 19 in the valve-stem 18 are raised sufficiently to allow the liquid in said chamber to discharge through the passage 14. By this arrangement each time the member 20 moves upwardly and closes the inlet opening 13, the liquid in the receptacle 1 is thereby prevented from flowing into the chamber 12, while the liquid in said chamber is discharging through the passage 14. After the liquid in chamber 12 has discharged through the cut-away portions 19 of stem 18, pressure is released from the lower end of said stem, whereupon spring 17 causes the valve 16 to engage its seat 15 and the member 20 to open the opening 13, with the result that the air that entered chamber 12 while the passage 14 was opened passes through opening 13 into the receptacle 1 and thereby allows the liquid in said receptacle to flow into and again fill said chamber.

In the alternate form of the dispenser depicted in Figs. 5 to 10, inclusive, the casing 5 is somewhat modified, being screw-threaded internally in order to allow an externally screw-threaded guide-nut 23 to fit therein, said guide-nut being substituted in lieu of cap 7 and having an opening 24 through which the member 20 is adapted to slide. Grooves 25 are formed in the upper face of the guide-nut 23, as best seen in Fig. 10, so that a screw-driver or other suitable tool may be inserted therein for the purpose of turning said guide-nut. By this arrangement the guide-nut 23 can be adjusted so as to increase or decrease the capacity of the chamber 12. The member 20, instead of being formed integrally with the valve 16, has a screw-threaded opening extending longitudinally therethrough, so as to fit on a screw-threaded rod 26 borne by said valve, as best seen in Figs. 5, 6, and 8, and by this arrangement is adjustable. In this form the member 20 is preferably adjusted so that the ends of the projections 21 borne by same extend slightly above the upper face of guide-nut 23, and by forming the screw-threads on the rod 26 with the same pitch as the internal screw-threads of valve-casing 5 and using a bifurcated screw-driver, which is so constructed that its prongs will straddle the upper end of rod 26 and will not only seat in the grooves 25 in guide-nut 23, but, also, will project into the opening 24 and thereby engage the sides of the projections 21, when the screw-driver is turned, whereby said guide-nut 23 and member 20 are caused to rotate simultaneously in the same direction. By this arrangement, when the guide-nut 23 is rotated so as to adjust same within the valve-casing 5, the member 20 accompanies a corresponding adjustment on rod 26 without the relative position of said guide-nut 23 to said member 20 being changed. A nut 27 fits on the upper part of valve-casing 5 in order to hold the washer 10 in engagement with the offset 11 in opening 4 of neck 6. The upper surface 28 of valve 16 is slightly concave in order to prevent the lower end of spring 17 from slipping off same.

While for the purpose of illustration the guide-nut 23 and nut 27 have been shown and described in connection with the form of the dispenser depicted in Figs. 5 to 10, inclusive, yet it should be understood that same may be used in connection with the form of the dispenser depicted in Figs. 1 to 4, inclusive.

We claim:

1. A liquid dispenser comprising a receptacle, a valve-casing secured thereto and having a chamber and a discharge opening at the bottom of said chamber, a cap borne by said casing and having an inlet opening communicating with said chamber, a valve-seat in the bottom of said chamber, a conical valve in said chamber adapted to control said discharge opening, resilient means for holding said valve normally in engagement with said seat, a stem borne by said valve and extending through said discharge opening and having its sides flattened to permit the egress of liquid and, also, the ingress of air through said discharge opening, a member borne by said valve adapted to control said inlet opening, and a pair of diametrically opposed projections having tapered sides extending from the upper end of said member for guiding same in said inlet opening.

2. A liquid dispenser comprising a receptacle, a valve-casing secured thereto and having a chamber and a discharge opening at the bottom of said chamber, an adjustable member for varying the size of said chamber having an inlet opening communicating with the upper end of said chamber, a conical valve in said chamber adapted to control said discharge opening, a stem borne by said valve extending through said discharge opening and having its sides flattened to permit the egress of liquid through said discharge opening, and a member borne by said valve for controlling the inlet opening in said member.

3. A liquid dispenser comprising a receptacle, a valve-casing secured thereto and having a chamber and inlet and discharge openings at the opposite ends of said chamber, a conical valve in said chamber adapted to control said discharge opening, a stem borne by said valve extending through said discharge opening and having its sides flattened to permit the egress of liquid and, also, the egress of air through said discharge opening, and an adjustable member borne by said valve for controlling said inlet opening.

4. A liquid dispenser comprising a receptacle, a valve-casing secured thereto and having a chamber and a discharge opening at the bottom of said chamber, an adjustable member having an inlet opening communicating with the upper end of said chamber, a conical valve in said chamber adapted to control said discharge opening, a stem borne by said valve extending through said discharge opening and having its sides flattened to permit the egress of liquid and, also, the ingress of air through said discharge opening, and an adjustable member borne by said valve for controlling said inlet opening.

5. A liquid dispenser comprising a receptacle, a valve-casing secured thereto and having a chamber and a discharge opening at the bottom of said chamber, an adjustable member having an inlet opening communicating with the upper end of said chamber, a conical valve in said chamber adapted to control said discharge opening, a stem borne by said valve extending through said discharge opening and having its sides flattened to permit the egress of liquid and, also, the ingress of air through said discharge opening, and an adjustable member borne by said valve for controlling said inlet opening, said members being so positioned that same can be adjusted simultaneously without changing their relative positions.

6. A liquid dispenser, including a receptacle, a valve-casing secured to the receptacle and having an inlet and an outlet, a valve in the casing for controlling the outlet and having a stem which extends through the outlet and having flattened portions to provide fluid passage-ways, a member connected to the upper end of said valve and formed with a pair of spaced diametrically opposed upwardly extending projections which have tapered sides, said projections extending into the inlet of the valve-casing, and a coil spring encircling said member and engaging the valve and the upper end of the valve casing.

7. A liquid dispenser including a receptacle provided with a chamber having an inlet and an outlet, a valve in the chamber for controlling the outlet and having a stem which extends through the outlet, adjustable means having an inlet to vary the size of said chamber, and adjustable means carried by the valve for controlling the inlet of said first mentioned adjustable means.

8. A liquid dispenser including a receptacle provided with a chamber having an inlet and an outlet, a valve in the chamber for controlling the outlet and having a stem which extends through the outlet, adjustable means having an inlet to vary the size of said chamber, and means carried by the valve to control the inlet of said adjustable means.

9. A liquid dispenser including a receptacle provided with a chamber having an inlet and an outlet, a valve in the chamber for controlling the outlet and having a stem which extends through the outlet, a guide nut threaded into engagement with the walls of said chamber and having an opening therein, a screw threaded rod extending upwardly from said valve, and a member having a screw threaded opening to receive said rod, said member being formed to control the opening of the guide nut.

In testimony whereof we hereunto affix our signatures in the presence of two witnesses.

JAMES N. BASKETT.
JOSEPH H. RODES.

Witnesses:
GEORGE G. ANDERSON,
WALTER C. GUELS.